N. HOSPERS.
Improvement in Churns.

No. 130,428.                                              Patented Aug. 13, 1872.

Witnesses:
P. C. Dieterich
W. A. Graham

Inventor:
Nicholas Hospers
per Munn & Co.
Attorneys.

UNITED STATES PATENT OFFICE.

NICHOLAS HOSPERS, OF PELLA, IOWA.

IMPROVEMENT IN CHURNS.

Specification forming part of Letters Patent No. 130,428, dated August 13, 1872.

Specification describing a new and useful Improvement in Churning-Machine, invented by NICHOLAS HOSPERS, of Pella, in the county of Marion and State of Iowa.

Figure 1:
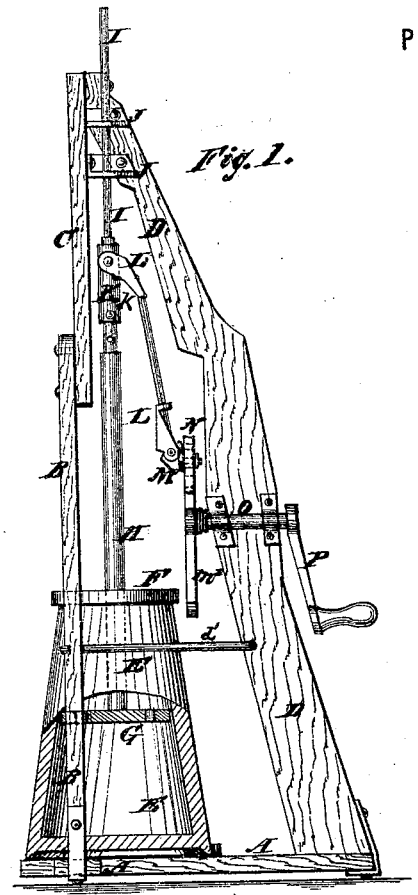
Figure 2:
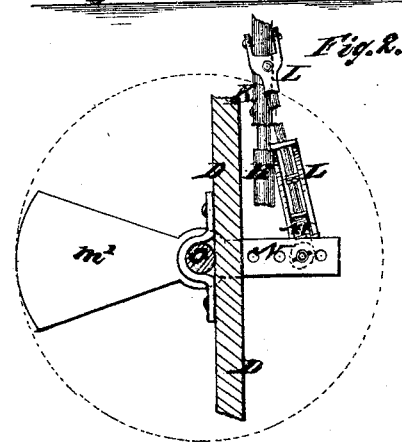

In the accompanying drawing, Figure 1 is a side view of my improved churning-machine, part being broken away to show the construction. Fig. 2 is a detail view of the operating mechanism.

Similar letters of reference indicate corresponding parts.

My invention has for its object to furnish an improved machine for operating a churn, which shall be simple in construction, convenient in use, and easily operated, and which shall be so constructed that it may be applied to any ordinary dasher-churn.

A is the base-frame of the machine, consisting of two bars crossing each other at right angles, and halved or otherwise framed to each other, so that their upper surfaces may be flush with each other to adapt them to serve as a platform for the churn. To the ends of the cross-bar of the frame A are attached the lower ends of two bars, B, which project upward and incline toward each other; and their upper ends are attached to the lower ends of a short vertical upright, C. The bars B should be so arranged as to allow space between them for the churn to pass in and out. To the rear end of the other bar of the base-frame A is attached the lower end of the bar D, which projects upward and inclines inward, and its upper end is secured to the upper end of the vertical bar C. $d'$ are brace-bars connecting the bar D to each of the bars B to strengthen the frame, and which may also serve as guides in placing the churn, and as supports to hold the churn steady while being used, for which latter purpose stops may also be attached to the base-frame A. E is the churn-body, which is provided with a cover, F, a dasher, G, and a dasher-handle, H, in the ordinary manner. I is a guide-rod, which passes up through and works in holes in guide-plates J attached to the upper parts of the bars C and D. To the lower end of the guide-rod I is attached a socket, K, to receive the upper end of the dasher-handle H, to which it is secured by a pin, several holes being formed in said handle H to receive the said pin, so that the dasher may always reach almost to the bottom of the churn E whatever length of stroke may be given to said dasher. L is a connecting-rod, the upper end of which is forked, and is pivoted to the upper part of the socket K or to the guide-rod I, as shown in Figs. 1 and 2, so as to give it a vertical but no lateral play upon said socket or rod. The lower end of the rod L is pivoted to the pin-block M, as shown in Figs. 1 and 2. The pin of the pin-block M passes through a hole in the crank-arm N, where it is detachably secured in place by a spring-key or other conveniently detachable device. Several holes are formed in the crank-arm N to receive the pin of the pin-block M, so that the said pin-block may be moved toward or from the axis of the crank to give a shorter or longer stroke to the dasher, according to the amount of milk in the churn, the connection between the dasher-handle H and the socket K being adjusted at the same time, so that the dasher, at each downward stroke, may come almost to but not touch the bottom of the churn E. The mechanism should be so adjusted that the dasher, at each upward stroke, may rise a little above the milk. The crank-arm N is attached to the inner end of the shaft O, which revolves in bearings attached to the bar D, and to its other or outer end is attached the crank P, by which the power is applied. The crank-arm N projects beyond the shaft O, and its projecting or free end $n'$ is made heavy to balance the weight of the connecting-rod, so that the mechanism may run steady. By this construction, as the crank P is revolved the revolution of the crank-arm N $n'$ carries the connecting-rod L from side to side, which partly rotates the dasher-handle H, giving to the dasher a screw movement while passing up and down through the milk.

Having thus described my invention, I claim as new and desire to secure by Letters Patent—

The churn-dasher H, connected with its actuating-crank N by a socket, K, forked and pivoted connecting-rod L, and pin-block M, as described, for the purpose of giving a combined reciprocating and rotary motion to the dasher, as set forth.

NICHOLAS HOSPERS.

Witnesses:
W. A. VAN STEENWYK,
DIRK KRAMER.